United States Patent [19]

Bures et al.

[11] Patent Number: 4,855,590

[45] Date of Patent: Aug. 8, 1989

[54] INFRARED TOUCH INPUT DEVICE HAVING AMBIENT COMPENSATION

[75] Inventors: Milan Bures, Tabaccoville; Paul P. Kratochvil, Kernersville; John R. Rowlette, Clemmons, all of N.C.

[73] Assignee: AMP Incorporated, Harrisburg, Pa.

[21] Appl. No.: 62,107

[22] Filed: Jun. 25, 1987

[51] Int. Cl.$^4$ ............................................. G01V 9/04
[52] U.S. Cl. ................... 250/221; 250/214 B; 340/712; 341/24; 341/31
[58] Field of Search ................ 250/221, 222.1, 214 B; 340/555, 556, 557, 365 P, 712

[56] References Cited

U.S. PATENT DOCUMENTS

| | | |
|---|---|---|
| 3,370,284 | 2/1968 | Bagno . |
| 3,704,396 | 11/1972 | Macdonald . |
| 3,723,737 | 3/1973 | Zeldman et al. ................ 250/221 X |
| 3,764,813 | 10/1973 | Clement et al. ................ 250/221 X |
| 3,775,560 | 11/1973 | Ebelina et al. .......................... 178/18 |
| 3,860,754 | 1/1975 | Johnson et al. .................. 340/365 P |
| 3,867,628 | 2/1975 | Brown .............................. 250/214 B |
| 3,970,846 | 7/1976 | Schofield, Jr. et al. ............. 250/221 |
| 4,061,925 | 12/1977 | van der Gaag et al. ............. 250/553 |
| 4,111,421 | 9/1978 | Mierzwinski ...................... 273/85 G |
| 4,243,879 | 1/1981 | Carroll et al. ........................ 250/221 |
| 4,267,443 | 5/1981 | Carroll et al. ........................ 250/221 |
| 4,313,109 | 7/1982 | Funk et al. ....................... 250/221 X |
| 4,356,393 | 10/1982 | Fayfield .......................... 250/221 X |
| 4,563,578 | 1/1986 | Nagai et al. ................... 250/222.1 X |
| 4,591,710 | 5/1986 | Komadina et al. ................. 250/221 |
| 4,672,195 | 6/1987 | Golborne et al. .................... 250/221 |
| 4,672,364 | 6/1987 | Lucas .............................. 250/221 X |
| 4,684,801 | 8/1987 | Carroll et al. ........................ 250/221 |
| 4,713,534 | 12/1987 | Masters et al. ................... 250/214 B |
| 4,719,339 | 1/1988 | Mizuno ............................... 250/221 |
| 4,725,726 | 2/1988 | Hasegawa et al. ................... 250/221 |

*Primary Examiner*—Edward P. Westin
*Attorney, Agent, or Firm*—Robert W. Pitts

[57] ABSTRACT

An input device which can be employed to input commands to a computer directly through a CRT display is disclosed. The input device employs a plurality of infrared light emitting diodes and phototransistors aligned in individual emitter-detector pairs. Infrared beams from the emitter cross the display field before striking the corresponding detector. Emitters and detectors are sequentially activated and each emitter is pulsed or modulated at a frequency different from the variation of ambient conditions during each emitter activation interval. The detection circuitry thus can distinguish the varying emitter signal from ambient or spurious variations. A number of pulses at the pulsed or modulated emitter frequency would be detected unless an opaque element were blocking the particular beam.

17 Claims, 6 Drawing Sheets fig. 1

INFRARED TOUCH INPUT DEVICE HAVING AMBIENT COMPENSATION

BACKGROUND OF THE INVENTION

1. Field of the Invention

This invention relates to an input detection system for detecting the presence and position of an opaque element within an irradiated field and more particularly to a touch input system employing infrared light emitting devices and light detecting devices to form a matrix of infrared beams spanning a display surface such that the presence of an opaque element or stylus will interrupt one or more beams.

2. Description of the Prior Art

The use of video displays as an output for information from a computer can present the operator with the potential to manipulate the displayed information. Traditionally, control of displayed information or cursors has been via a keyboard. Recently, a number of devices have been introduced which allow an operator to directly interact with the video display. These types of devices have included light pens, desk-type mouse controllers, or touch input devices such as a switch matrix or opto-electronic matrices. While generally switch-type overlays, placed adjacent a video display, are inexpensive to apply and utilize, they are generally susceptible to contact wear as well as distortion of the video information which is presented to the viewer, particularly in high usage environments. However, opto-matrix schemes utilize light, which is generally in the infrared region, and the switch matrix presented by the light beams is invisible to the viewer and, therefore, does not distort the video information displayed to the viewer and is not subject to wear in high usage environments. A number of schemes which utilize opto-matrix frames may be found in U.S. Pat. No. 4,267,443, entitled "Photoelectric Input Apparatus", issued May 12, 1981 to Carroll et al.; and U.S. Pat. No. 3,764,813, entitled "Coordinate Detection System", issued Oct. 9, 1973 to Clement et al. These schemes address problems inherent with opto-matrix devices such as increasing frame resolution without a corresponding increase in components, surrounding or ambient light compensation, or optimization of emitter/detector driving and detecting networks, respectively. These systems still have drawbacks. Large component usage results in higher costs. Some systems exhibit difficulty in compensating for reflection or glare resulting in styli hits which are not recorded.

Ambient light also results in significant problems. Several systems for ambient light compensation have been proposed, and some are marketed in touch entry systems. For example, U.S. Pat. No. 4,267,443 discloses an ambient light sampling system. U.S. Pat. No. 3,970,846 discloses an ambient light compensation feedback loop for affecting the bias voltage at the base of a phototransistor.

It is desirable to have a device which minimizes the number of components necessary for addressing and detecting emitters and detectors. It is also desirable that the device dynamically compensates for ambient light and for variations in emitter output and detector sensitivity. At the same time, the device should employ a minimal number of components for addressing and detecting emitters and detectors Traditionally, ambient light compensation schemes have required the use of a large amount of energy to drive light emitting devices, such as infrared light emitting diodes, because intensity of the light emitted by the diode must be greater than the intensity of the ambient light. In practice, this requirement has meant that expensive light emitting and light detecting devices must be employed. Even high performance light emitting diodes and phototransistors must be operated outside of their normal operating ranges.

There is a need for a touch input system which furnishes good ambient light compensation while permitting the use of low cost, readily available components. The necessity of precisely aligning LED's and phototransistors is also a problem. Further reduction of the intensity of the light emitted by the LED's is also highly desirable. The system disclosed in the instant application permits such improvements.

SUMMARY OF THE INVENTION

An input detection system for detecting the presence of an opaque element within an irradiated field includes a plurality of light emitting devices and light detecting devices located on the periphery of the irradiated field. In the preferred embodiment, infrared light emitting diodes and phototransistors are positioned along opposite sides of a display surface, such as a CRT screen, used to output information from a computer. Individual light emitting devices and individual light detecting devices are aligned so that emitter-detector pairs are formed. In the preferred embodiment of this invention, corresponding emitters and detectors are sequentially activated so that there is no interference between beams in close proximity. During the interval in which each emitter and corresponding emitter are activated, the emitter is pulsed or modulated at a frequency markedly different from the frequency at which ambient light and noise would vary. Signals due to ambient conditions can thus be disregarded by using appropriate detector circuitry and the varying signal from the pulsed or modulated emitter can be recognized. Failure to detect this modulated signal would then correlate to the presence of an opaque element blocking the particular emitter-detector pair. Each emitter is varied a plurality of times during its activation interval to distinguish the modulated or pulsed signal from spurious signals such as those caused by switching the detectors.

BRIEF DESCRIPTION OF THE DRAWINGS

FIGS. 3A and 3B are each half of a schematic showing the driver and device selection circuitry.

FIG. 5 is a timing diagram.

DETAILED DESCRIPTION OF THE PREFERRED EMBODIMENT

Figure 1:
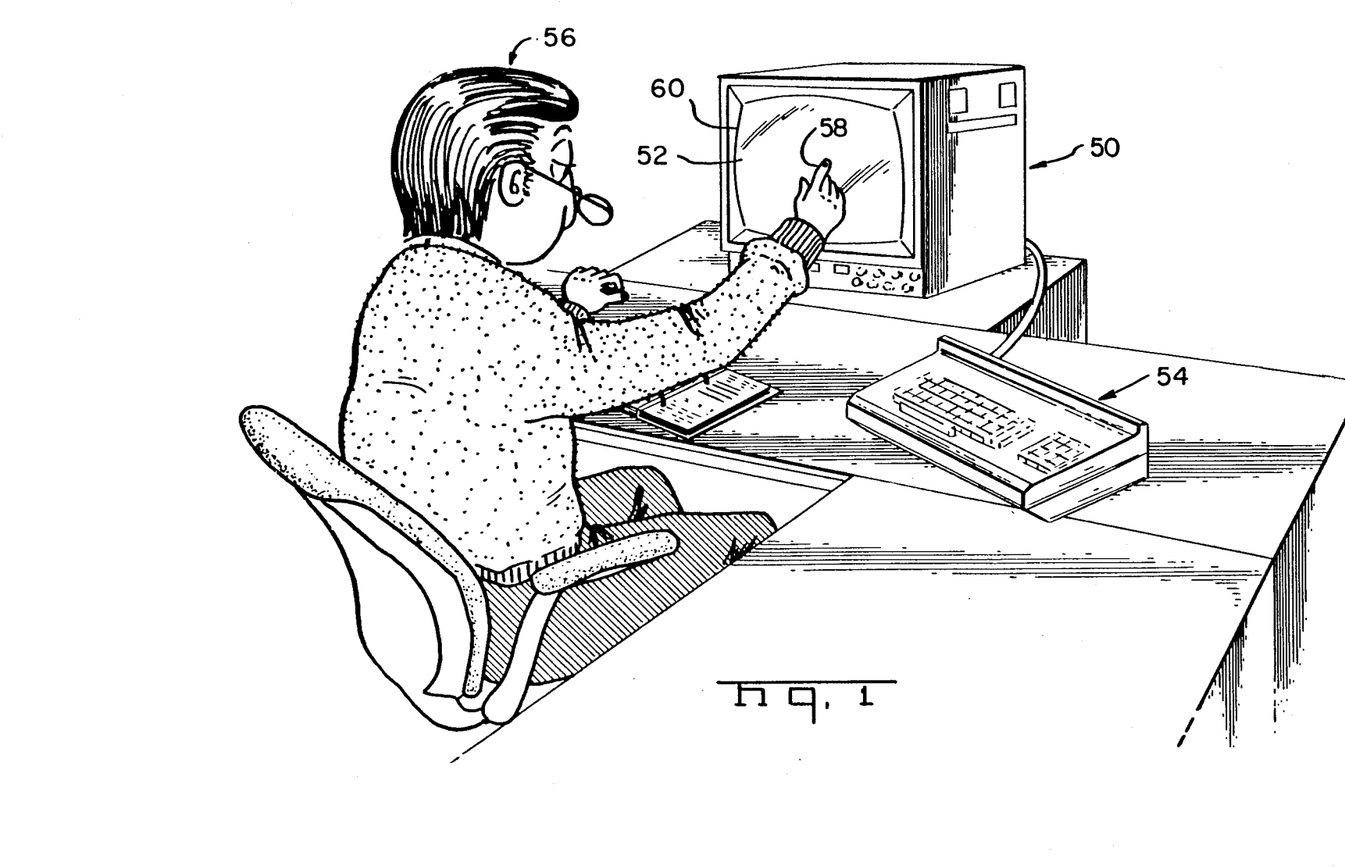
FIG. 1 shows an operator interacting directly with a visual display by using the instant invention.

FIG. 1 depicts the manner in which an operator can interact directly with information displayed on a CRT used in conjunction with a host computer such as a personal computer. The preferred embodiment of this invention is intended to provide real time inputs to a personal computer, such as an IBM PC. As such, this device comprises means for transmitting real time input information directly to the host computer. It should be understood, however, that this invention could be adapted to process input information which could then be input to the host computer through an RS232 interface in a conventional manner.

As shown in FIG. 1, an operator 56 can interact through a CRT 50 displaying information on a screen 52 simply by directly touching specific locations on the screen 52. Infrared light emitting diodes and detectors, such as phototransistors, could be mounted in a bezel or frame 60 located on the periphery of the display area 52 in a conventional manner such that a plurality of infrared beams would scan the display area 52. When the operator would place his finger 58 at a specific location on the display area 52, one or more infrared beams, extending between aligned emitters and detectors, would be interrupted. The unique location of the operator's finger 58 would then be transmitted to the host computer 70. More generally, this invention provides a means by which an opaque element, such as the operator's finger 58 or other styli, could be detected when disposed within an irradiated field, such as the display screen 52, formed by positioning light emitting devices, such as infrared LED's, and light detecting devices, such as phototransistors, around the periphery of the irradiated field with the individual light emitting devices being aligned with corresponding individual light detecting devices.

Figure 2:
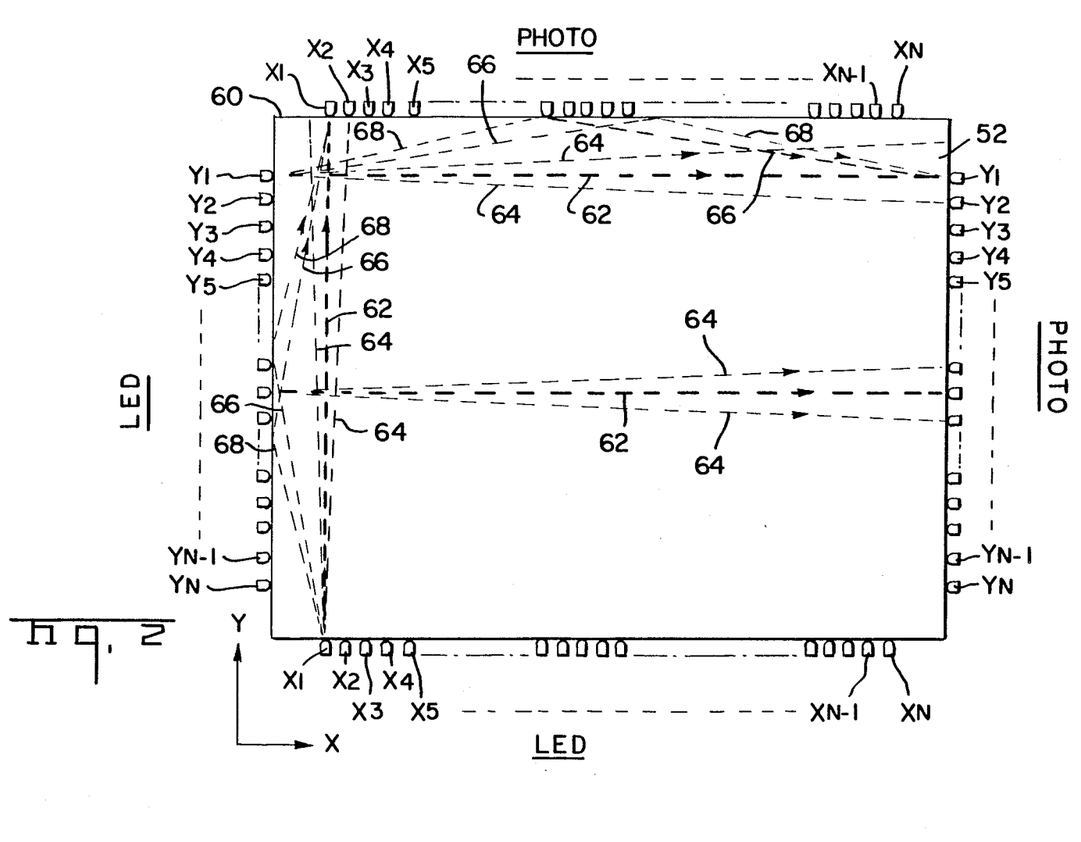
FIG. 2 shows an opto matrix frame with an orthogonal array of light emitting devices and light detecting devices.

FIG. 2 shows arrays of light emitting devices and arrays of light detecting devices disposed around the periphery of an irradiated field 52. A touch input device, as depicted herein, when used with the display of a CRT, would be configured in this manner, with two orothogonal arrays of light emitting devices and two orthogonal arrays of photodetectors disposed along the sides of a rectangular dispaly area 52. Light emitting diodes and phototransistors are commonly used for such touch input systems, although it should be understood that other light emitting devices and light detecting devices could be suitably employed. As shown herein, a Y array of light emitting diodes (LED's), $Y_1$ through $Y_N$, are located along the left of the frame 60 surrounding the display area or irradiated field 52. A similar array of light emitting diodes, $X_1$ through $X_N$, is located along the bottom of the frame 60. Arrays of phototransistors, $Y_1$ through $Y_N$, located along the right, and $X_1$ through $X_N$, located along the top of the frame 60 are disposed such that individual corresponding LED's and phototransistors, such as $X_1$-$X_1$ and $X_2$-$X_2$ and $Y_1$-$Y_1$ and $Y_2$-$Y_2$, are aligned. Thus, when light is emitted by an individual light emitting device, such as $X_1$, this light will be incident upon a corresponding aligned phototransistor $X_1$. FIG. 2 shows, however, that the light emitted by individual LED's or other light emitting devices is incident not only upon the corresponding aligned photodetector but is also incident upon adjacent photodetectors. Note that while the light emitted along centerline 62 between emitter-detector pairs $X_1$ will be incident on detector $X_1$, light emitted along line 64, within the dispersion angle of conventional light emitting devices, will be incident upon adjacent phototransistor $X_2$. Light indicated at 66 and 68 might also be incident upon sides of the frame 60 causing certain glare and reflection problems in practical touch input systems. A common method of ensuring that light emitted by a given light emitting device is detected only by the corresponding light detecting device or phototransistor, $X_1$-$X_1$, and not by an adjacent light detecting device such as $X_2$, is to sequentially activate light emitting devices and sequentially scan the arrays of phototransistors. In other words, when a given light emitting device is activated and emits light, only the aligned phototransistor, and not adjacent phototransistors, is activated. Thus, activation of light emitting diode $X_1$ would occur at the same time that phototransistor $X_1$ is activated to detect incident light. The adjacent phototransistor $X_2$, upon which light from LED $X_1$ would also be incident, would not be turned on during the interval in which LED $X_1$ is activated. Note that this sequential activation of light emitting diodes and phototransistors permits accurate detection of the presence of an opaque element positioned between aligned LED's and phototransistors. The light from an adjacent LED, which is not blocked by an opaque element disposed in the field, will not activate a "blocked" phototransistor simply because that LED will not be turned on during the activation interval of the "blocked" phototransistor. This sequential activation of light emitting devices and light detecting devices is achieved by conventional multiplexing techniques and scan rates of 20 scans per second for an array of 40 emitter-detector pairs can be easily achieved.

In addition to activation of individual light detecting devices by incident light from an aligned light emitting device, the photodetectors can also be activated by the incidence of ambient light. In conventional detection systems, the intensity of the incident light from an aligned photodetector is measured, either in addition to ambient light or by first electrically subtracting or compensating the electrical signal due to incident ambient light. In the present invention, the intensity of the incident light from the light emitting device is not measured. Rather, each light emitting device is pulsed at a desired frequency during its activation interval and the characteristic pulse signature, frequency, or number of pulses is detected during that activation interval to determine if the detected light is truly from the activated light emitting diode. In other words, the signal from each light emitting diode is modulated, and only detection of this modulated signal will establish that the particular beam is not blocked. In other words, if the modulated signal is not detected during the activated signal interval for a particular light emitting diode, then an opaque element or stylus must be blocking the particular emitter-detector pair, thus establishing the presence of an opaque element or a hit at a specific location within the irradiated field or display 52.

FIG. 3 shows the circuitry in addition to a conventional host computer 70 which can be used to generate the modulated light pulses from each light emitting device in the arrays on the periphery of the irradiated field. The LED driver circuitry shown in FIG. 3 relies upon the clock in the host computer to control pulse generation. The driver circuitry of FIG. 3 implements five functions for pulsing two arrays of sequentially activated light emitting devices. The divider 72 is responsive to the internal clock frequency of the host computer and generates useful frequencies, based on the host computer internal clock frequency, for scanning, triggering multiple pulses of individual diodes, incrementing individual pairs of emitters and detectors, and for resetting the scan of emitters and detectors. When the approapriate frequency for pulsing or modulating light emitting devices has been established by divider 72, this frequency is then supplied to pulse driver 74 which drives individual light emitting diodes at a specified frequency. Divider 72 also generates another frequency suitable for activating individual light emitting devices and photodetectors during scans of the emitter-detector arrays. When used herein, the term "activiting" is meant to refer to the time interval during which a particular light emitting device and its corresponding light detecting device are turned on. The term "pulsing" or "modulating" is used to denote that each light emitting device is driven during its respective activation period such that a plurality of pulses will be emitted during each activation interval at a frequency greater than the frequency of activation for the light emitting devices. The driver circuitry of FIG. 3 shows that the X arrays of photodetectors and light emitting devices are addressed by addressing circuitry 76 while the separate Y arrays of photodetectors and light emitting devices are similarly addressed by separate addressing circuitry 78. The X arrays of emitters and detectors are addressed independently of the addressing of the Y arrays, even though, in the preferred embodiment, individual emitters and detectors are turned on and off at the same frequency. Note that the number of emitter-detector pairs in the X array need not be equal to the number of emitter detector pairs in the Y array. In the preferred embodiment of this invention, 40 emitter-detector pairs are located in the X array while only 27 emitter-detector pairs are located in the Y array.

The sequential activation of emitter-detector pairs, by addressing circuitry 76 and 78, can be interrupted upon detecton of an opaque element within the irradiated field. Interrupt circuitry 80 ensures that the host computer has received a signal denoting the presence of a "hit" before the scanning of the emitter-detector arrays continues.

In the preferred embodiment of this invention, the divider 72 is implemented by employing two binary counters, each used as a divider. Each of these binary counters consists of a conventional 74 HCT 393N component. Note that the pin positions for each device are numbered in the conventional manner. The internal clock frequency from the host computer 70 is input directly into the first binary counter 102. In the preferred embodiment, an internal clock frequency of 4.77 megahertz may be input into binary counter 102. The output of binary counter 102 is input into a similar binary counter 104 to further divide the frequency. In the preferred embodiment, the output of the first binary counter 102 is 18.6 kilohertz, the frequency chosen for pulsing or modulating the LED's. Note that other frequencies can easily be chosen and the 18 kilohertz frequency merely represents an easily obtainable frequency in light of the internal clock frequency of the host computer. The frequency output by the second binary counter 104 must be suitable for sequential activation of emitter-detector pairs. For a practical touch input system, it is desirable that at least 20 scans per second of the entire arrays must be performed. Thus, the number of emitter-detector pairs in each array will determine the desired value of the scanning frequency output from the second divider 104.

The frequency output from the second binary counter 104 is input into a counter 108 in the X array addressing circuitry 76. The incrementing counter 108 is also a 74 HCT 393N binary counter and the output is connected and parallel at 110 to a shift register 112 which serves as an interface to the host computer. This shift register comprises a 74 HCT 245. The output of shift register 112 is transferred in parallel at 114 to the host computer 70. Suitable logic is provided in the host computer to receive the signals from the shift register 112 to enable the host computer to track the scanning of the plurality of emitters and detectors in the X array. The output of counter 108 is also fed to a 4 bit comparator 118 in parallel at 116. The 4 bit comparator 118 comprises a 74 HCT 393. This 4 bit comparator 118 is used to determine when the last emitter-detector pair in a given array is scanned so that the counter 108 can be reset to begin a new scan of the X arrays. Suitable outputs from the counter 108 are input into multiplexer 122 which is, in turn, connected in parallel at 124 and 126 to the array of X LED's and X phototransistors, respectively. Multiplexer 122 comprises a 74 HCT 138.

The Y array of LED's and phototransistors is addressed by addressing circuitry 78 which comprises a binary counter 132, a shift register 136, a 4 bit comparator 142, and a multiplexer 146. These components are interconnected in parallel at 134, 138, 148 and 150 in the same manner as the X addressing circuitry. The 4 bit comparator 142 is connected to the binary counter 132 by an inverter 144 in the same manner as in the X addressing circuitry. The individual components 132, 136, 142 and 146 comprise the same components as elements 108, 112, 118 and 122 respectively.

The pulse driver circuitry 74 is activated through an And gate 152 in response to signals output by both the first counter 102 and the second counter 104 and divider 72. The output of the first counter 102 is shown at A in the timing diagram of FIG. 5 and represents the frequency of activation of the pulses or the modulation frequency for the LED's. The output of the second binary counter 140 and divider 72 is shown at B in FIG. 5 and establishes the scanning frequency for LED's in an array. Thus, the And gate 152, upon receipt of positive signals at A and B, will result in an output of a number of pulses during each positive pulse as output by the second binary counter 104. Note that in the preferred embodiment of this invention, N is equal to 8. As will be appreciated subsequently, a plurality of pulses must be employed in accordance with this invention and, in general, N will be equal to 3 or greater. The output of the And gate 152 is fed through inverter 154 and a suitable resistor capacitive network to transistors 164 and 166 which comprise driving circuitry which can be connected to the LED's in a conventional manner. Transistors 164 and 166 comprise 2N3906 devices. It should be noted that only a single driver 74 is needed for the plurality of emitter-detector pairs.

The hold circuitry 80 is connected to the host computer and an acknowledgement signal is generated by suitable logic in the host computer 70 continue the scan for either the X and Y array, and generally for both. When an opaque element is detected within the array, And gates 106 and 128 ensure that a signal will be received from divider 72 only after the appropriate detector information is transmitted to the host computer.

Figure 4:
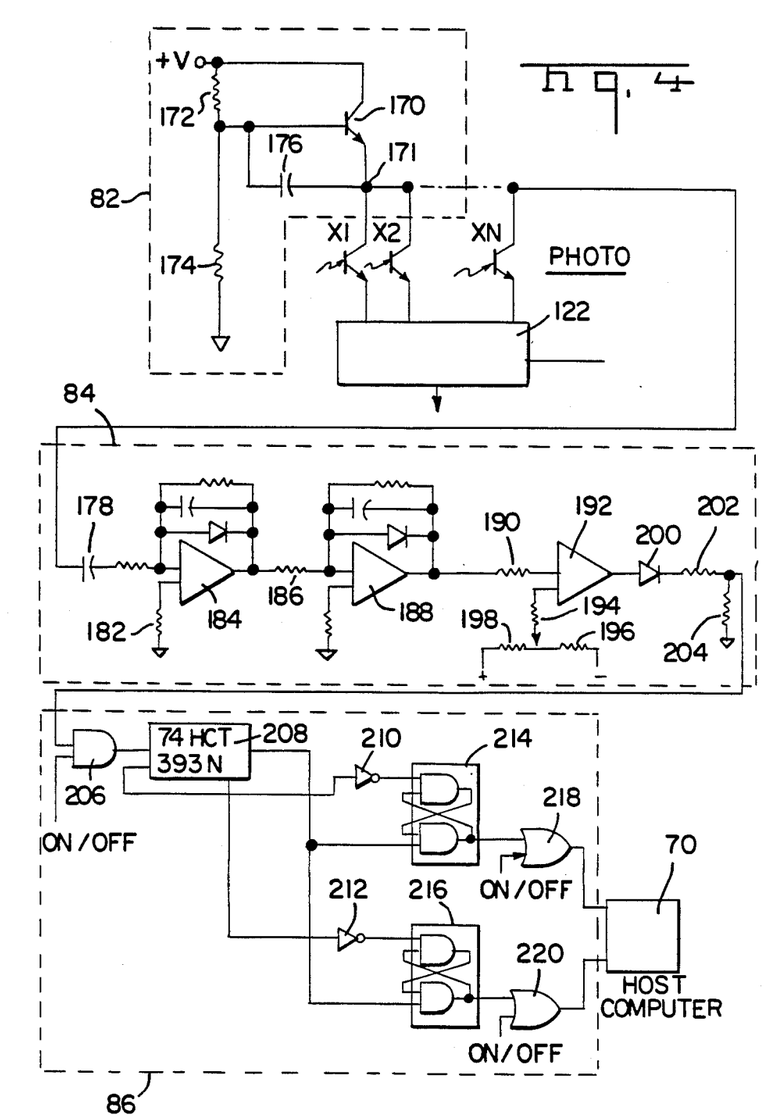
FIG. 4 depicts the signal detection circuitry.
Figure 7A:
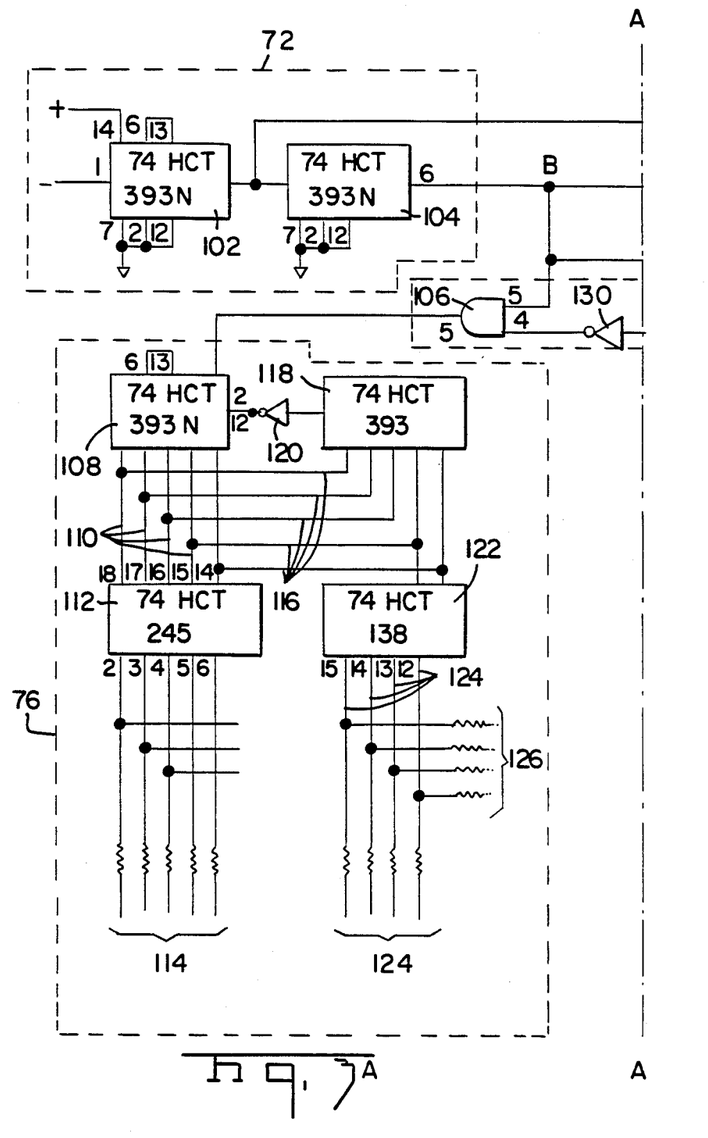
Figure 7B:
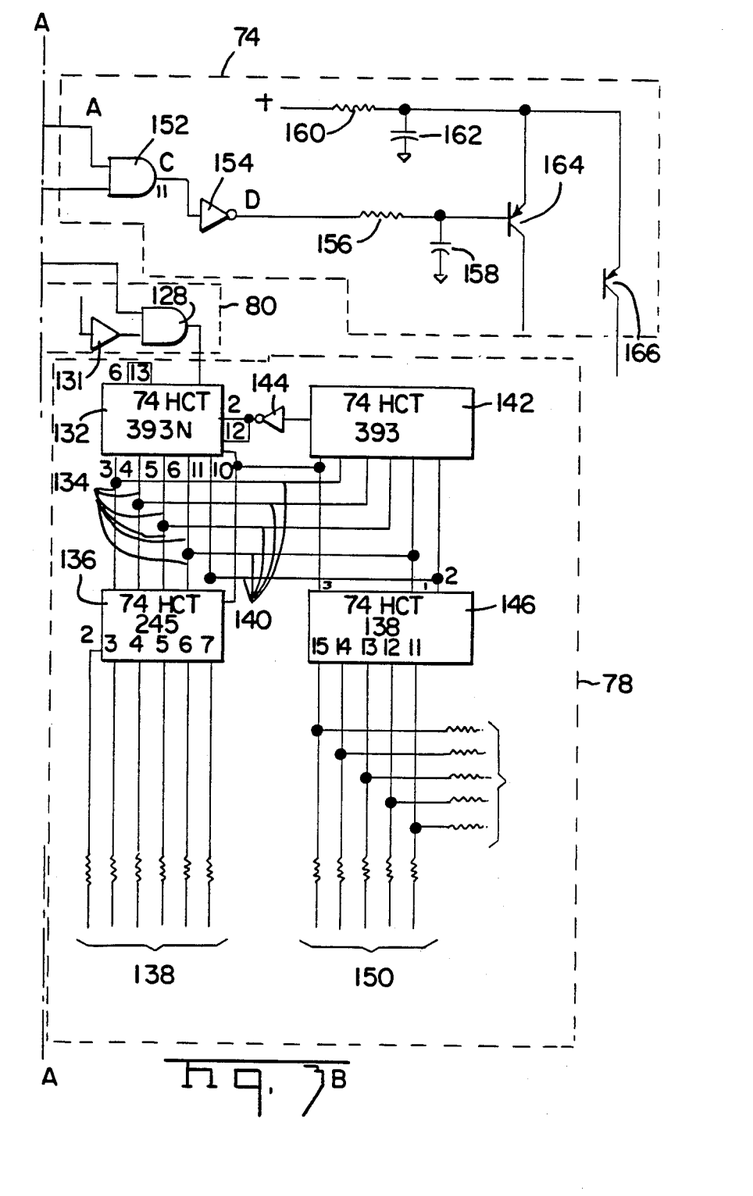
Figure 9:
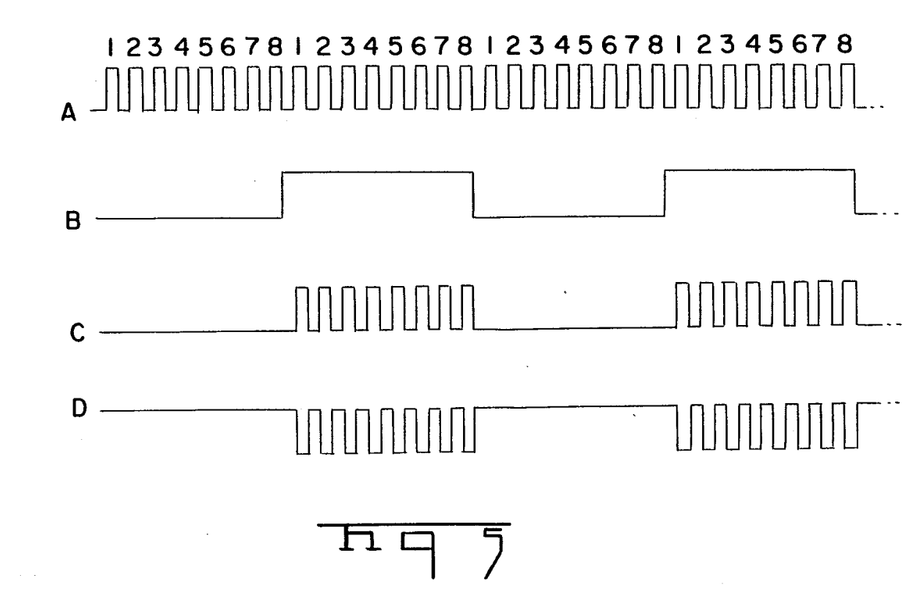

FIG. 4 is a circuit diagram of the detection circuitry employed in the preferred embodiment of this invention. This detection circuitry includes ambient compensation circuitry 82, a one shot circuit 84, and a counter and latch network 86. FIG. 4 depicts the X array of phototransistors which are individually addressed through multiplexers 122, as previously discussed. The Y array of phototransistors are individually addressed in a similar manner. The collectors of the phototransistors $X_1$-$X_1$ are sequentially connected to the emitter of a transistor 170 as each phototransistor is activated. The ambient compensation network is designed to maintain a fixed voltage at the node 171 between the transistor 170 and the individually selected phototransistor $X_1$ through $X_N$. Transistor 170 and the selected phototransistor $X_1$ through $X_N$ are in series and the voltage drop across the two transistors remains constant. This circuit functions as a voltage divider. A constant voltage source is connected to the base of transistor 170 through a relatively high resistance 172 such that the base emitter is small and, thus, the collector to emitter current through transistor 170 remains small. When ambient light strikes the selected phototransistor $X_1$ through $X_N$, the collector to emitter resistance of the selected phototransistor would decrease, thus decreasing the voltage drop across the phototransistor and decreasing the voltage at node 171. However, the time constant of the circuit is chosen such that additional current will be injected at the base of the transistor 170, thus reducing the resistance across 170 and maintaining the voltage at node 171 constant. The RC time constant of this network is chosen such that a relatively constant voltage will be maintained at node 171 so long as the light incident upon the selected phototransistor $X_1$ through $X_N$ vaires or fluctuates at a relatively low frequency. For example, the variation of ambient light due to fluorescent lights would vary at a frequency of approximately 150 hertz. So long as the variations in ambient light are confined to relatively low frequencies, the voltage at node 171 can remain substantially constant. Since the incident light from the pulsed LED's is varying at a much higher frequency, voltage changes at node 171 due to incident light from the pulsed LED's cannot be maintained constant and these changes in voltage will be transmitted through the ambient compensation network. Modulated LED frequencies from 5 to 10 kilohertz can easily be detected in this manner. In the preferred embodiment of this invention, the modulated frequency of LED pulsing is equal to 18 kilohertz, which can be easily derived from the internal clock frequency of the computer with which this device is employed.

Signals of very short duration will also be transmitted through the ambient compensation network 82. For example, a multiplexing spike, which occurs when each phototransistor is turned on, cannot be eliminated in the ambient compensation network 82. For this reason, a single relatively short duration pulse of the light emitting device cannot be relied upon as an indication that the phototransistor has, in effect, detected light from a specific light emitting device. Therefore, a plurality of pulses during each activation cycle is generated by the light emitting devices.

This plurality of pulses is received by the phototransistor, and since these pulses vary at a frequency at which the ambient compensation network is substantially transparent, these signals result in a fluctuation of the voltage at 171, and these fluctuations are transmitted to a one shot network 84. The one shot network 84 essentially functions as a missing pulse detector. The one shot 84 is a retriggerable one shot and, as long as signals are received by the one shot, corresponding to the pulses received by the phototransistor from the corresponding light emitting detector, the one shot does not have time to rise and change levels indicating the presence of a "hit" which would occur when an opaque element or stylus blocks the beam between aligned light emitting devices and light detecting devices.

The retriggerable one shot 84 comprises two operational amplifiers, the first 184 having a gain of 10, and the second 188 having a gain of 100, for a total gain of 1000. It should be understood that a single amplifier having the same total gain could also be employed. The comparator 192 is used to adjust the level of the signal for input into the counter and latch circuitry 86. The counter 208 comprises a binary counter and, in the preferred embodiment, a 74 HCT 393N device is employed. If N pulses are counted by counter 208, then the respective latch 214, 216 is set. The latch is reset when another emitter-detector pair is activated. If N pulses are not detected before the latch is reset, a signal is transmitted to the host computer indicating that an input or "hit" has been detected.

The detection circuitry employed herein is not dependent upon the rise and fall time of the individual phototransistors employed, since only the presence or absence of individual pulses must be detected. Therefore, the frequency at which the LED's are pulsed, and the speed fo the scan, is not affected by the rise and fall time of the optoelectric devices employed.

A touch input system, in accordance with the present invention, only requires approximately 10 miliamps through the light emitting diodes employed. Thus, the light emitting diodes do not have to be driven at an extraordinarily high level and very inexpensive infrared diode having a wave length of 950 nanometers can be employed in conjunction with the preferred embodiment of this invention. Such an infrared diode would be invisible to night vision devices.

The preferred embodiment of this invention depicts a touch input system which can be constructed using quite inexpensive devices. It can be appreciated that a touch input system having much greater capabilities and suitable for processing signals prior to transmission to a host computer can also be constructed in accordance with this invention. Therefore, the claims presented herein are in now way limited to the preferred embodiment of this invention since other embodiments would be readily apparent to one of ordinary skill in the art.

We claim:

1. An input detection system for detecting the presence of an opaque element in an irradiated field, comprising:
   a plurality of light emitting devices located on the periphery of the irradiated field;
   a plurality of light detecting devices located on the periphery of the irradiated field, the light emitting devices and the light detecting devices being located on opposite extremities of the irradiated field, individual light detecting devices being aligned with corresponding individual light emitting devices;
   means for activating corresponding aligned light emitting devices and light detecting devices during the same time interval;
   means for pulsing each activated light emitting device N times during its activated time interval, wherein N is greater than 2;
   means for counting the number of pulses received by each corresponding light detecting device during its activated time interval; and
   means for reporting the presence of an opaque element in alignment with corresponding aligned and activated light emitting devices and light detecting devices when the number of pulses received by each activated light detecting device during its activated time interval is less than N.

2. The detection system of claim 1 wherein the plurality of light emitting devices are individually sequentially activated for a specified time interval and the plurality of light detecting devices are individually sequentially activated for a specified time interval, corresponding aligned light emitting devices and light detecting devices being activated during the same time interval to form emitter-detector pairs.

3. The detection system of claim 2 wherein each activated light emitting device is pulsed at a specified frequency.

4. The detection system of claim 3 wherein the means for counting the number of pulses received by each corresponding light detecting devices comprises means for counting only pulses occurring at the specified frequency.

5. The detection system of claim 4 including filter means for filtering out eletronic signals generated by the light detecting means other than the pulses varying at the specified frequency.

6. The detection system of claim 1 wherein N is equal to 8.

7. The detection system of claim 1 wherein the light detecting means comprises a phototransistor, the pulses received by the phototransistor being detected by detecting changes in the voltage at the phototransistor collector.

8. An input detection system for detecting the presence of an opaque element in an irradiated field in the presence of varying ambient light, comprising:
a plurality of light emitting devices located on the periphery of the irradiated field;
a plurality of light detecting devices located on the periphery of the irradiated field, the light emitting devices and the light detecting devices being located on opposite extremeties of the irradiated field, individual light detecting devices being aligned with corresponding individual light emitting devices;
means for activating corresponding aligned light emitting devices and light detecting devices during the same time interval;
means for modulating each activated light emitting device during its activated time interval, at a frequency greater than the frequency at which the ambient light varies so that each activated light emitting device is pulsed a plurality of times during its activated time interval;
means for filtering out electronic signals generated by the light detecting device varying at a frequency less than the frequency at which the light emitting device is modulated; and
means for reporting the presence of an opaque element in alignment with corresponding aligned and activated light emitting devices and light detecting devices when the number of pulses received by each activated light detecting devices during its activated time interval is less than the number of times that each light emitting device is pulsed;
whereby the presence of light from each light detecting device incident on each corresponding aligned light detecting device can be detected in the presence of ambient light, and the presence of an opaque element in the irradiated field is detected when light emitted from a light emitting device is not incident on the corresponding aligned light detecting device.

9. The input detection system of claim 8 wherein each light detecting device comprises a phototransistor and the means for filtering out signals received by the light detecting device varying at a frequency less than the frequency at which the light emitting device is modulated comprises compensation means for maintaining a constant voltage at the collector of each phototransistor at the aforementioned lower frequencies.

10. An input detection system for detecting the presence of an opaque element in an irradiated field in the presence of varying ambient light comprising:
a plurality of light emitting devices located on the periphery of the irradiated field;
a plurality of light detecting devices located on the periphery of the irradiated field, the light emitting devices and the light detecting devices being located on opposite extremeties of the irradiated field, individual light detecting devies being aligned with corresponding individual light emitting devices;
means for activating corresponding aligned light emitting devices and light detecting devices during the same time interval;
means for compensating for varying ambient light by maintaining a signal, otherwise responsive to current through the light detecting device varying in response to variations in the intensity of ambient light, at a constant level despite variations in the intensity of ambient light; means for pulsing each activated light emitting device during its activated time interval, at a frequency greater than the frequency at which the ambient light varies so that each activated light emitting device is pulsed a plurality of times during its activated timer interval;
means for detecting the light pulses incident upon the light detecting devices at the frequency at which each light emitting device is pulsed; and
means for reporting the presence of an opaque element in alignment with corresponding aligned and activated light emitting devices and light detecting devices when the number of pulses received by each activated light detecting device during its activated time interval is less than the number of times that each light emitting device is pulsed.

11. The input detection system of claim 10 wherein the light detecting devices comprise phototransistors.

12. The input detection system of claim 11 wherein the means for compensating for varying ambient light comprises means for maintaining the voltage at the collector of each phototransistor constant as ambient light varies.

13. The input detection system of claim 12 wherein a voltage divider circuit of which each phototransistor is a part comprises the means for maintaining the voltage at the collector constant.

14. The input detection system of claim 13 wherein each phototransistor is sequentially connected to the voltage divider circuit during the interval during which the respective phototransistor is activated.

15. The inpt detection system of claim 14 wherein each phototransistor is sequentially connected to a transistor to form the voltage divider circuit, the voltage drop across each phototransistor being maintained at a constant level when the phototransistor is subjected only to varying ambient light by changing the base current on the transistor.

16. The input detection system of claim 10 wherein the means for detecting the light pulses incident upon the light detecting devices at the frequency at which each light emitting device is pulsed comprises a retriggerable one shot.

17. The input detection device of claim 16 wherein the light detecting devices are each pulsed N times when activated, the detecting means further comprising a counter and a latch, the latch being set to indicate the presence of an opaque element if N pulses are not detected during the activation interval of each light emitting device.

* * * * *

UNITED STATES PATENT AND TRADEMARK OFFICE
CERTIFICATE OF CORRECTION

PATENT NO. : 4,855,590

DATED : August 8, 1989

INVENTOR(S) : Milan Bures, John R. Rowlette and Paul P. Kratochvil

It is certified that error appears in the above-identified patent and that said Letters Patent is hereby corrected as shown below:

After sheet 1 of Drawings, Insert Figure 2 as per attached.

Signed and Sealed this

Tenth Day of September, 1991

Attest:

HARRY F. MANBECK, JR.

Attesting Officer

Commissioner of Patents and Trademarks

UNITED STATES PATENT OFFICE
CERTIFICATE OF CORRECTION

Page 2 of 2

Patent No. 4,855,590  Dated August 8, 1989

Inventor(s) Milan Bures, John R. Rowlette and Paul P. Kratochvil

It is certified that error appears in the above-identified patent and that said Letters Patent is hereby corrected as shown below: